(12) United States Patent
Saito et al.

(10) Patent No.: US 8,730,027 B2
(45) Date of Patent: May 20, 2014

(54) VEHICLE NOTIFICATION SOUND EMITTING APPARATUS

(75) Inventors: Hironori Saito, Yokohama (JP); Katsumi Kimura, Sagamihara (JP); Tsuyoshi Kanuma, Kawasaki (JP); Hideo Yoshino, Utsunomiya (JP); Yuji Watanabe, Komae (JP); Toshiyuki Yamamoto, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/576,551

(22) PCT Filed: Feb. 7, 2011

(86) PCT No.: PCT/IB2011/000198
§ 371 (c)(1),
(2), (4) Date: Aug. 1, 2012

(87) PCT Pub. No.: WO2011/098880
PCT Pub. Date: Aug. 18, 2011

(65) Prior Publication Data
US 2012/0293318 A1    Nov. 22, 2012

(30) Foreign Application Priority Data

Feb. 9, 2010  (JP) ................................. 2010-026115
Feb. 9, 2010  (JP) ................................. 2010-026124
Dec. 22, 2010 (JP) ................................. 2010-285349

(51) Int. Cl.
*B60Q 5/00* (2006.01)

(52) U.S. Cl.
USPC ........ 340/474; 340/463; 340/436; 340/384.1; 700/301

(58) Field of Classification Search
CPC ........... B60Q 5/00; B60Q 5/005; B60Q 5/008
USPC .............. 340/463, 441, 435, 436, 466, 384.3, 340/384.4, 573.1, 474, 384.1, 384.5; 381/61, 86, 66, 85; 701/300, 301, 22
See application file for complete search history.

(56) References Cited

U.S. PATENT DOCUMENTS 5,635,903 A    6/1997  Koike et al.
5,684,473 A *  11/1997 Hibino et al. ................. 340/903
(Continued)

FOREIGN PATENT DOCUMENTS

CA    2407283    8/2004
EP    1562177    8/2005
(Continued)

OTHER PUBLICATIONS

International Search Report (PCT/ISA/210) and Written Opinion of the International Search Authority (PCT/ISA/237) for International Application No. PCT/IB2011/000198, mailed Jun. 8, 2011.
(Continued)

*Primary Examiner* — Hung T Nguyen
(74) *Attorney, Agent, or Firm* — Global IP Counselors, LLP

(57) ABSTRACT

A vehicle notification sound emitting apparatus is basically provided with a sound emitting device and a notification sound control device. The sound emitting device emits a starting movement notification sound to outside of a vehicle to inform a person in an outside area surrounding the vehicle that the vehicle will transition from a stopped state to a moving state, and emits a moving notification sound to outside of the vehicle to inform a person in the outside area surrounding the vehicle that the vehicle is moving. The notification sound control device operates the sound emitting device to selectively emit the starting movement notification sound. The notification sound control device includes a notification sound emission timing section that sets a start timing of the starting movement notification sound in response to a shift operation having been performed and an additional start movement preparation operation of the vehicle having been performed.

14 Claims, 4 Drawing Sheets

(56) References Cited

U.S. PATENT DOCUMENTS

| | | | |
|---|---|---|---|
| 6,751,534 B2 * | 6/2004 | Robichaux et al. | 701/22 |
| 7,188,005 B2 * | 3/2007 | Toba et al. | 701/1 |
| 7,501,934 B2 * | 3/2009 | Tischer | 340/384.3 |
| 7,650,001 B2 * | 1/2010 | Yasushi et al. | 381/61 |
| 7,764,800 B2 * | 7/2010 | Maeda | 381/86 |
| 7,812,740 B2 * | 10/2010 | Mergen | 340/904 |
| 2007/0063827 A1 | 3/2007 | Ferrone et al. | |
| 2007/0257783 A1 * | 11/2007 | Matsumoto et al. | 340/425.5 |
| 2010/0266135 A1 * | 10/2010 | Theobald et al. | 381/71.4 |

FOREIGN PATENT DOCUMENTS

| | | |
|---|---|---|
| FR | 2687623 | 8/1992 |
| JP | 3-15364 U | 4/1991 |
| JP | 5-11683 U | 6/1993 |
| JP | 5-44683 U | 6/1993 |
| JP | 07-322403 | 12/1995 |
| JP | 08-002321 | 2/1996 |
| JP | 2001-39216 A | 2/2001 |
| JP | 2004-136831 | 5/2002 |
| JP | 2002-238101 | 8/2002 |
| JP | 2004-306954 A | 11/2004 |
| JP | 2005-343360 | 12/2005 |
| JP | 2006-199106 A | 8/2006 |
| JP | 2009-040318 | 2/2009 |

OTHER PUBLICATIONS

An English translation of the Russian Office Action for the corresponding Russian patent application No. 2012138538111(062414) issued on Nov. 19, 2013.

Mexican Office Action for the corresponding Mexican patent application No. MX/a/2012/009233, issued on Jan. 10, 2014.

An English translation of the Japanese Office Action for the corresponding Japanese patent application No. 2010-026115 issued on Dec. 17, 2013.

The Mexican Office Action for the corresponding Mexican patent application No. MX/a/2012/009233 issued on Jun. 7, 2013.

An English translation of the Japanese Office Action for the corresponding Japanese patent application No. 2010-026115 issued on Mar. 4, 2014.

* cited by examiner

NOTIFICATION SOUND PROHIBITION CONTROL

NOTIFICATION SOUND VOLUME INCREASE CONTROL

VEHICLE NOTIFICATION SOUND EMITTING APPARATUS

CROSS-REFERENCE TO RELATED APPLICATIONS

This application is a U.S. National stage of International Application No. PCT/IB2011/000198, filed Feb. 7, 2011. This application claims priority under 35 U.S.C. §119 to Japanese Patent Application Nos. 2010-026124, filed Feb. 9, 2010, 2010-026115, filed Feb. 9, 2010 and 2010-285349, filed Dec. 22, 2010. The entire disclosures of Japanese Patent Application Nos. 2010-026124, 2010-026115 and 2010-285349 are hereby incorporated herein by reference.

BACKGROUND

1. Field of the Invention

The present invention generally relates to vehicle sound emitting technology for informing a person in an area surrounding of the vehicle that the vehicle is moving, or is about to move, in an advancement direction, e.g., forward or rearward. More specifically, the present invention relates to a vehicle notification sound emitting apparatus that emits a notification sound to inform people of the existence of the vehicle.

2. Background Information

Some vehicles have a very quiet operating sound and/or moving sound (including a vehicle equipped with an internal combustion engine). For example, an electric powered vehicle such as an electric car configured to be electrically driven (EV drive) using only an electric motor is typically very quiet while operating and/or moving. Also for example, a hybrid vehicle having an electric drive mode (EV mode) in which the vehicle is driven solely with an electric motor is typically very quiet while operating and/or moving. In such very quiet vehicles, the operating sound and/or moving sound (vehicle information) such as the existence of the vehicle, an intent of a driver as indicated by a gear shift or other operation, an advancement direction of the vehicle (forward or reverse), a vehicle speed and/or other traveling condition of the vehicle are often not perceivable to a person in a surrounding area of the vehicle by emitting a notification sound to the outside of the vehicle. Thus, while typically it is desirable for the occupants of the vehicle to have a very vehicle, there are times when it is desirable for the vehicle convey the existence of the vehicle to a person in a surrounding area of the vehicle by emitting an notification sound to the outside of the vehicle.

Among the vehicle information mentioned above, technology has been proposed for emitting a movement notification sound to inform a person in an outside area surrounding a vehicle that the vehicle is moving in a forward direction (i.e., an advancement direction). For example, conventional technology is disclosed in Japanese Laid-Open Patent Publication No. 11-208307 in which a movement notification sound is emitted to indicate movement of the vehicle in a forward direction (i.e., an advancement direction).

In the conventional technology, when an ignition switch is turned ON and the vehicle is put into a drivable state, the apparatus detects that the ignition switch is ON and the vehicle is in a drivable state and emits a notification sound to inform a person in an outside area surrounding the vehicle regarding forward movement of the vehicle. Also in the conventional notification technology, the notification sound is emitted from the time the vehicle is put into a drivable state. In other words, a person in an outside area surrounding the vehicle can be informed of the vehicle's forward movement by a notification sound that is emitted before a movement start operation is performed after a movement start preparation operation is completed, i.e., before the vehicle actually starts moving forward.

Another example conventional movement notification sound technology is disclosed in Japanese Laid-Open Patent Publication No. 2005-343360 in which a notification sound emitting apparatus emits a forward movement notification sound for informing a person in a surrounding area of a vehicle that the vehicle is moving forward when the vehicle has started moving forward from a stop. A volume of the notification sound is changed between when the vehicle is starting into motion and when the vehicle is moving.

SUMMARY

It has been discovered that the conventional vehicle notification sound emitting apparatus, such as the ones mentioned above, the notification sound informing a person of a vehicle's movement is emitted from the moment that the vehicle enters a drivable state due to the ignition switch being turned ON. Consequently, the vehicle movement notification occurs too early and incurs such problems as will now be explained.

A vehicle movement notification sound should be emitted immediately before the vehicle starts moving, which should generally correspond with when a movement start preparation operation has been completed. However, since the movement notification sound of the conventional apparatus is emitted from precisely when the vehicle enters a drivable state due to the ignition switch being turned ON, the notification sound will continues until the vehicle starts moving due to a movement start operation being performed. Thus, the movement notification sound could possibly be emitted for a long time before the vehicle actually starts moving if the vehicle does not start moving immediately after it was put into a drivable state. If the notification sound is emitted unnecessarily for a long time, then it can become an annoyance to a person in an outside area surrounding the vehicle.

Moreover, it is also possible for the apparatus to detect when the vehicle starts moving based on a vehicle speed and emit a movement notification sound when movement is detected. However, in this case, the movement notification sound would not be emitted until the vehicle starts moving. Thus, in this case, the notification sound would not serve the intended purpose of informing a person about the vehicle movement prior to movement.

One aspect of the present disclosure is to provide a vehicle notification sound emitting apparatus that emit a movement notification sound at a timing corresponding to when a movement start preparation operation has been completed, and in such a fashion that the movement notification sound is not emitted merely when the vehicle enters a drivable state. As a result, when the vehicle has been put into a drivable state but does not start moving for a while, the movement notification sound is not emitted unnecessarily and a person in an outside area surrounding the vehicle is not subjected to the annoyance of listening to an unnecessary movement notification sound for a long period of time.

In view of the above mentioned conventional technology, a vehicle notification sound emitting apparatus according to the present disclosure as will now be explained. The basic features of a notification sound emitting apparatus according to the present disclosure are based on the premise that the apparatus will serve to emit a movement notification sound to inform a person in a surrounding area that the vehicle is about to move.

A vehicle notification sound emitting apparatus according to the present disclosure is proposed that basically comprises a sound emitting device and a notification sound control device. The sound emitting device is configured to emit a starting movement notification sound to outside of a vehicle to inform a person in an outside area surrounding the vehicle that the vehicle will transition from a stopped state to a moving state, and emit a moving notification sound to outside of the vehicle to inform a person in the outside area surrounding the vehicle that the vehicle is moving. The notification sound control device is configured to operate the sound emitting device to selectively emit the starting movement notification sound. The notification sound control device includes a notification sound emission timing section that is configured to set a start timing of the starting movement notification sound in response to a shift operation, which issues a vehicle movement command, having been performed and an additional start movement preparation operation of the vehicle having been performed.

These and other objects, features, aspects and advantages of the present notification sound emitting apparatus will become apparent to those skilled in the art from the following detailed description, which, taken in conjunction with the annexed drawings, discloses a preferred embodiment of the notification sound emitting apparatus.

BRIEF DESCRIPTION OF THE DRAWINGS

Referring now to the attached drawings which form a part of this original disclosure.

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
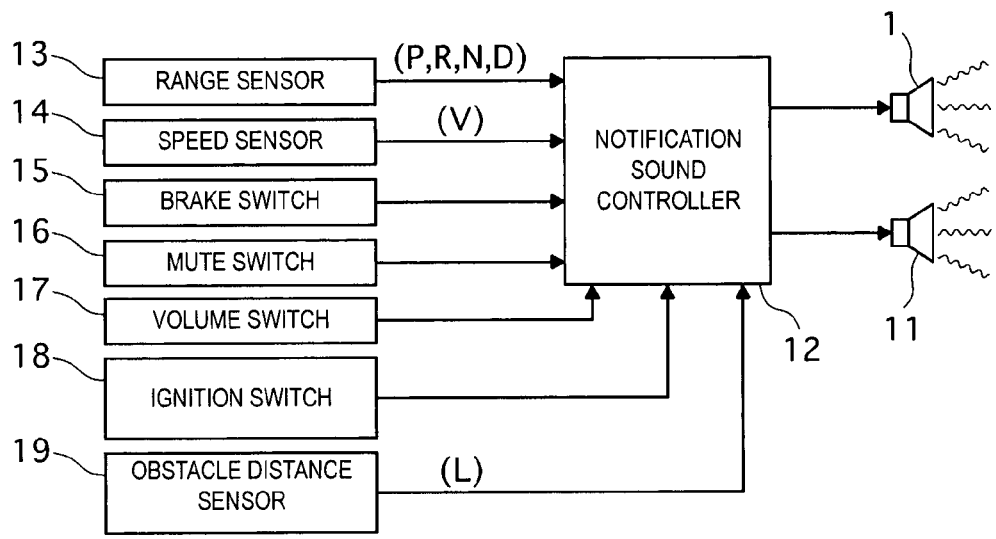
FIG. 1 is a control block diagram showing a control system or vehicle notification sound emitting apparatus including a notification sound controller for controlling a notification sound emitting device of the vehicle notification sound emitting apparatus in accordance with an illustrated embodiment.

Referring initially to FIG. 1, a vehicle notification sound emitting apparatus is illustrated in accordance with one embodiment. More specifically, FIG. 1 is a control system diagram showing a control system for controlling notification sound emitting devices of the vehicle notification sound emitting apparatus. In this illustrated embodiment, a cabin exterior speaker 1 is provided as an exterior notification sound emitting device for issuing a notification to a person (e.g., pedestrian or motorcycle rider) in an outside area surrounding the vehicle. Also in this illustrated embodiment, a cabin interior speaker 11 is provided as an interior notification sound emitting device for issuing a notification to a driver.

In the illustrated embodiment, a vehicle in which the notification sound emitting apparatus is used is an electric car that has only an electric motor as a power source and is driven electrically (EV drive) using the electric motor. However, it should be clear from this disclosure that the vehicle notification sound emitting apparatus disclosed herein can also be applied to a hybrid vehicle having both an electric motor and an engine as power sources, where the vehicle is driven solely with the electric motor in an electric drive mode (EV mode), and driven with power from both the electric motor and the engine in a hybrid mode (HEV mode). Likewise, the vehicle notification sound emitting apparatus disclosed herein can be applied to an engine driven vehicle having only an engine as a power source.

In the illustrated embodiment, the cabin exterior speaker 1 is arranged in a space inside a motor room of a frontward portion of the vehicle. The motor room of the vehicle is where a power unit is located that includes an electric motor serving as a power source of the electric car and a transmission. More specifically, the cabin exterior speaker 1 is arranged in a space where mud, rocks, and other contaminants picked up by the wheels will not enter the speaker and such contaminants as rain, snow, and water from a high-pressure car wash will not enter the speaker. By using this space as a resonance box for the cabin exterior speaker 1, the notification sound emitting apparatus according to this embodiment can be made into a non-directional sound source.

The cabin exterior speaker 1 and the cabin interior speaker 11 are controlled by a notification sound controller as shown in FIG. 1. The notification sound controller 12 receives signals from a range sensor 13, a vehicle speed sensor 14, a brake switch 15, a mute switch 16, a sound volume increasing switch 17, an ignition switch 18 and an obstacle distance sensor 19. In this illustrated embodiment, the notification sound controller 12 corresponds to a notification sound control device or section. Basically, the notification sound controller 12 is configured to operate the speakers 1 and 11 (e.g., the sound emitting devices) in response to occurrence of a vehicle condition such as vehicle movement or preparation to vehicle movement. The speakers 1 and 11 emit various movement notification sounds depending on the vehicle condition. The term "movement notification sound" is generically used herein to refer to both actual vehicle movement as well as preparation for starting vehicle movement in a forward advancement direction and/or a reverse advancement direction. The term "drivable state" as used here in refers to a vehicle in a nonmoving state but with the vehicle ready to move upon operating an accelerator or the like.

The range sensor 13 is configured to detect if the vehicle transmission is set to Park (P), Reverse (R), Neutral (N), or Drive (D) by reacting to a shift (range selection) operation performed by a driver to park the vehicle or designate a desired movement direction.

The vehicle speed sensor 14 is configured to detect a vehicle speed V. The brake switch 15 is configured to turn ON when the vehicle is being braked by depressing a brake pedal and OFF when the vehicle is not being braked (brake pedal is released). The mute switch 16 is configured to be manually pressed in order to mute a sound emitted from the cabin exterior speaker 1. The sound volume increasing switch 17 is configured to be pressed in order to increase the volume of a sound emitted from the cabin exterior speaker 1. The ignition switch 18 is configured to put the power unit into a drivable state and outputs an ON/OFF signal to the notification sound controller 12 depending on the position of the ignition switch 18. The obstacle distance sensor 19 is configured to detect a distance L between the host vehicle and another vehicle or other obstacle in front of the vehicle.

Now, the manner in which the notification sound controller 12 operates the cabin interior speaker 11 in this embodiment will now be explained. In the case where the transmission is shifted to reverse (R), an R range selection signal will be received by the notification sound controller 12 from the range sensor 13. In response to receiving the R range selection signal, the notification sound controller 12 drives the cabin interior speaker 11 to emit an "R range selection notification sound." The R range selection notification sound informs the driver that the R range has been selected. In the illustrated embodiment, the R range selection notification sound is an intermittent sound. In the case where an obstacle's distance L from the host vehicle is smaller than a preset distance, an obstacle detection signal will be received by the notification sound controller 12 from the obstacle distance sensor 19. In response to receiving the obstacle detection signal, the notification sound controller 12 drives the cabin interior speaker 11 to emit an "obstacle proximity notification sound" using, for example, a voice to inform the driver that the vehicle is close to an obstacle.

There are other notification sounds emitted inside the vehicle cabin to warn a driver, such as a "seatbelt notification sound" (not shown in the figures) emitted to warn that a seatbelt is not latched. However, the seatbelt notification sound is not emitted from the cabin interior speaker 11, but from a separate dedicated speaker or buzzer that is different from the cabin interior speaker 11 that is used by the notification sound controller 12 for notification that the vehicle is close to an obstacle. In other words, in the illustrated embodiment, the cabin interior speaker 11 is a separate and distinct notification sound emitting device from those used for other notification sounds emitted inside the vehicle cabin.

Operational control of the cabin exterior speaker 1 executed by the notification sound controller 12 shown in FIG. 1 will now be explained. In this embodiment, the movement notification sounds emitted from the cabin exterior speaker 1 include, but not limited to, a starting forward movement notification sound S, a forward moving notification sound D and a reverse movement notification sound R. The starting forward movement notification sound S (also called "S" sound) is emitted as a notification before the vehicle starts moving forward. The forward moving notification sound D (also called "D" sound) serves as a movement notification sound that is emitted when the vehicle is actually moving forward. The reverse movement notification sound R (also called "R" sound) serving as a movement notification sound emitted when the vehicle is actually moving in reverse and/or has been shifted in a reverse gear. The forward movement start notification sound (S sound) and the forward movement notification sound (D sound) together constitute a forward advancement alarm sound serving to notify about forward movement of the vehicle when the vehicle is in the D range. The starting forward movement notification sound (S sound) and the forward moving notification sound (D sound) together constitute a forward advancement notification sound serving to notify about forward movement of the vehicle when the vehicle is in the D range.

The starting forward movement notification sound S is a soft sound similar to an electronic ring tone produced by a software phone, the forward moving notification sound D is a pseudo engine sound resembling an engine sound generated when an engine-driven vehicle moves, and the reverse movement notification sound R is the same intermittent sound as the R range selection notification sound emitted from the cabin interior speaker 11 when the R range is selected.

As just mentioned, the forward moving notification sound D is a pseudo engine sound and it is emitted for a long period of time. Consequently, it could be annoying to listen to the forward moving notification sound D continuously, and it is not necessary for a driver to hear the forward moving notification sound D. Conversely, the starting forward movement notification sound S is a soft sound like that of a software phone and it is only emitted for a short period of time from immediately before the vehicle starts moving forward until the vehicle starts moving forward. Thus, the starting forward movement notification sound S is not annoying to a driver and is preferably heard by the driver so that the driver can know that a starting forward notification has been emitted. In view of these requirements, in this embodiment, the forward moving notification sound D is configured to be a pseudo engine sound as will now be explained and the starting forward movement notification sound S is set to a soft sound like that emitted by a software phone as will be explained later.

In view of the propagation properties of sound between the inside and outside of the vehicle cabin, a vehicle is typically constructed such that sounds with comparatively high frequencies (typically 1.5 kHz to 6 kHz, although it varies depending on the vehicle) do not easily penetrate the cabin interior from outside the cabin. However, a vehicle is typically constructed such that sounds with comparatively low frequencies (typically below 1.5 kHz, although it varies depending on the vehicle) do easily penetrate the cabin interior from outside the cabin. Therefore, in this embodiment, the forward moving notification sound D is configured to be a pseudo engine sound in a prescribed range of comparatively high frequencies (preferably 2 kHz to 4 kHz) that do not easily enter the cabin interior from outside the cabin. In this way, the forward moving notification sound D is not heard unnecessarily by a driver inside the vehicle cabin. As a result, the forward moving notification sound D (pseudo engine sound) does not become an annoyance to the driver. Moreover, forward moving notification sound D (pseudo engine sound) is readily heard by a person in an outside area surrounding the vehicle and reliably informs the person of the existence and movement of the vehicle.

However, if the starting forward movement notification sound S is set to a sound (e.g., pseudo engine) similar to the forward moving notification sound D, then the starting forward movement notification sound S will need to be set to a volume larger than the volume of the car horn in order for a driver inside the vehicle cabin to be able to hear the starting forward movement notification sound S and recognize that the forward movement start notification has been issued. However, at such a volume, a person in the surrounding area will be startled by the sound.

Therefore, in this embodiment, the forward movement start sound (S sound) is set to be a soft sound like an electronic ring tone of a software phone that lies in a comparatively low frequency range that readily penetrates the inside of the vehicle cabin from outside the vehicle. Due to its low frequency, such a starting forward movement notification sound S readily penetrates the inside of the vehicle cabin from outside the vehicle such that a driver inside the vehicle cabin can hear the starting forward movement notification sound S and unmistakably recognize that the forward movement start notification has been issued without the forward movement notification sound being set to a large volume (i.e., without startling people in a surrounding area). Also, the starting forward movement notification sound S is not annoying or unpleasant to a driver because it is a soft sound like that of a software phone and it is only emitted for a short period from immediately before the vehicle starts moving forward until the vehicle starts moving forward.

Figure 2:
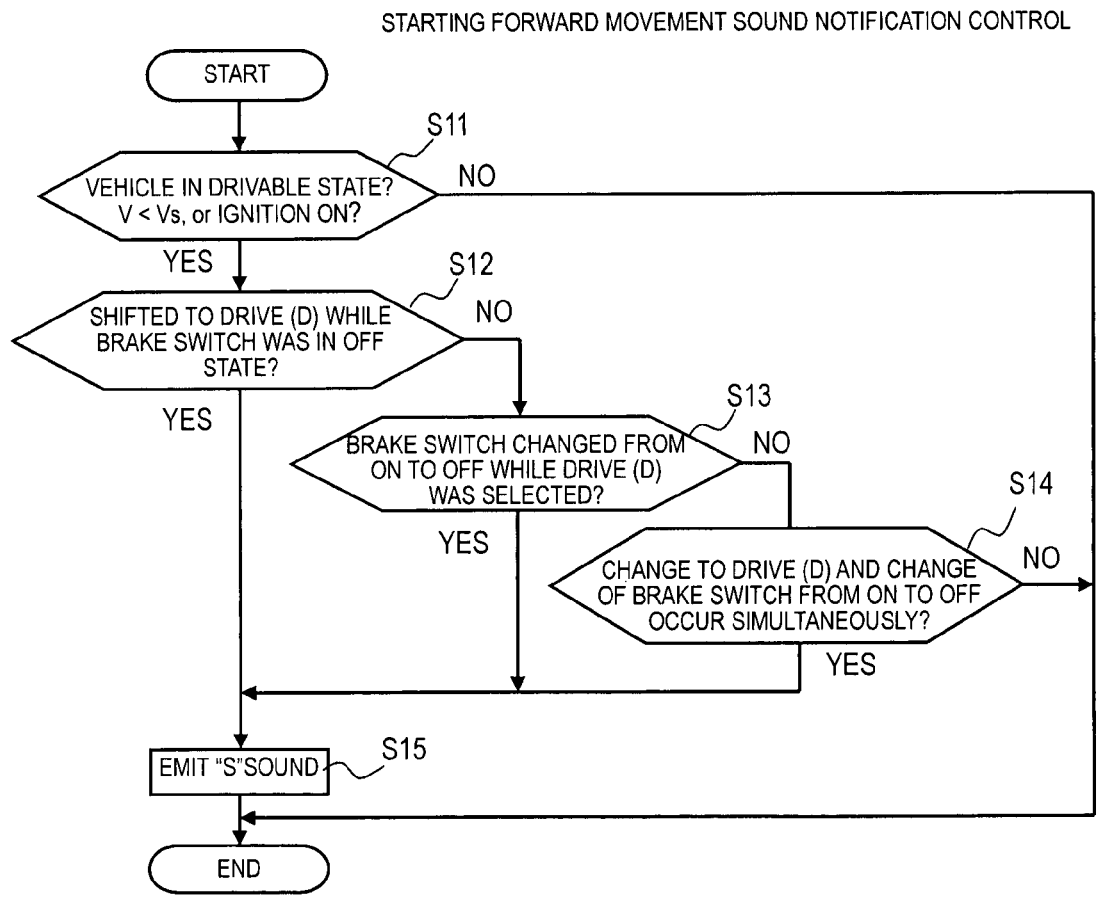
FIG. 2 is a flowchart showing a control program executed by the notification sound controller shown in FIG. 1 in order to control starting a starting forward movement notification sound (S sound)

In order to control the starting forward movement notification sound S, the notification sound controller 12 of FIG. 1 executes the control program shown in FIG. 2. In step S11, the notification sound controller 12 checks if the vehicle is in a drivable state. This determination can be accomplished by comparing a current vehicle speed V with a stop determination vehicle speed Vs (e.g., Vs=1 km/h) and/or checking the state of the ignition switch being ON or OFF. If a current vehicle speed V is smaller than the stop determination vehicle speed Vs and the ignition switch is ON, then the notification sound controller 12 determines a drivable state exists. If the vehicle speed V is equal to or larger than the stop determination vehicle speed Vs (e.g., Vs=1 km/h) such that the vehicle is determined to be in a moving state or if the ignition switch is OFF such that the vehicle is in a non-drivable state, then the notification sound controller 12 ends the control sequence and skips step S15 such that the starting forward movement notification sound S is not emitted. Thus, in step S11, the notification sound controller 12 determines that the vehicle is stopped but in a drivable state by checking that the vehicle speed is below a prescribed value and that the state of the ignition switch 18 is ON. In this illustrated embodiment, step S11 of the process executed by the notification sound controller 12 corresponds to a movement state detecting device or section.

If the notification sound controller 12 determines that the vehicle is stopped (i.e., V<Vs) and that the vehicle is in a drivable state (ignition switch 18 is ON) in step S11, then the notification sound controller 12 proceeds to step S12. In step S12, the notification sound controller 12 determines if an operation changing the range to the D range (shifted to the drive (D) position) occurred while the brake switch 15 was in an OFF state (i.e., the brake not being operated). If the result of step S12 is Yes, then the notification sound controller 12 proceeds to step S15. In step S15, the notification sound controller 12 drives the cabin exterior speaker 1 such that a soft sound resembling an electronic ring tone of a software phone.

If the result of step S12 is No, then the notification sound controller 12 proceeds to step S13. In step S13, the notification sound controller 12 determines if the brake switch 15 changed from ON to OFF (i.e., if the brake pedal changed from a depressed braking state to a released non-braking state) while the D range was in a selected state. If the result of step S13 is Yes, then the notification sound controller 12 proceeds to step S15. In step S15, the notification sound controller 12 drives the cabin exterior speaker 1 such that a soft S sound resembling an electronic ring tone of a software phone is emitted. In this illustrated embodiment, step S13 of the process executed by the notification sound controller 12 corresponds to a start movement intention detecting section or device.

If the result of step S13 is No, then the notification sound controller 12 proceeds to step S14 and determines if a change to the D range occurred simultaneously or substantially simultaneously with the brake switch 15 being changed from ON to OFF (i.e., if the brake pedal changed from a depressed braking state to a released non-braking state). If the result of step S14 is Yes, then the notification sound controller 12 proceeds to step S15 and drives the cabin exterior speaker 1 such that a soft S sound resembling an electronic ring tone of a software phone is emitted.

In steps S13 and S14, if the brake pedal is being returned slowly from a depressed state and the driver's foot has not yet separated from the brake pedal, then the brake switch 15 will still be ON and not yet changed to OFF. Consequently, the notification sound controller 12 will not proceed to step S15 and the starting forward movement notification sound S cannot be emitted.

If the driver were to mistakenly think that the starting forward movement notification sound S had been emitted while the driver was slowly (gradually) returning the brake pedal, then the driver might start driving while believing that any person in a surrounding area of the vehicle had been warned by the starting forward movement notification sound S that the vehicle would be starting into motion. This would be undesirable from a safety perspective. Furthermore, while the brake pedal is undergoing a slow brake pedal return operation, there is a possibility that the braking force will decline and the vehicle will start moving due to, for example, a creep force or a downward slope of a road surface. Thus, caution is necessary to ensure safety.

However, in this embodiment, as mentioned previously, the starting forward movement notification sound S is a notification sound in a comparatively low frequency range that easily penetrates the inside of the vehicle cabin from outside the vehicle and can be readily heard by the driver. Thus, since the driver can easily recognize when the forward movement start notification has been issued, the driver can also easily recognize that the starting forward movement notification sound S was not emitted during a slow brake pedal return operation. As a result, with this embodiment, the driver will not mistakenly believe that the starting forward movement notification sound S was emitted during a slow brake pedal return operation. In other words, the driver will assume that a person near the vehicle has not heard the starting forward movement notification sound S and is not aware that the vehicle will start moving if the driver has not heard the starting forward movement notification sound S. Thus, the driver can strive to drive safely and a great advantage in terms of driving safety can be achieved.

If the result of step S14 is No, then the notification sound controller 12 ends the control loop and skips step S15 such that the starting forward movement notification sound S is not emitted.

In short, the notification sound controller 12 drives the cabin exterior speaker 1 such that the starting forward movement notification sound S is emitted when any of the following conditions occurs while the vehicle is stopped (V<Vs) and in a drivable state (ignition switch 18 is ON) (step S11): (1) an operation changing the range to the D range occurs while the brake pedal is in a released non-braking state (step S12); (2) the brake pedal changes from a depressed braking state to a released non-braking state while the D range is in a selected state (step S13); or (3) an operation changing the range to the D range occurs simultaneously with the brake pedal changing from a depressed braking state to a released non-braking state (step S14). Otherwise, the cabin exterior speaker 1 remains in a non-driven state and the starting forward movement notification sound S is not emitted.

In this embodiment, the starting forward movement notification sound S is emitted immediately before the vehicle starts moving when the vehicle is stopped in a drivable state (step S11) and a shift operation changing the range to the D range occurs while the brake pedal is in a released (non-braking) state (step S12), a foot depressing the brake pedal releases the brake pedal while the D range is in a selected state (step S13), or a shift operation changing the range to the D range occurs simultaneously with a brake release operation in which a foot depressing the brake pedal is released from the brake pedal (step S14). In other words, in these situations, the starting forward movement notification sound S is emitted immediately by the cabin exterior speaker 1 before the vehicle starts moving (step S15).

If the apparatus were configured to emit the starting forward movement notification sound S when the vehicle enters a drivable state due to the ignition switch 18 being turned ON, then the starting forward movement notification sound S would be emitted too soon and the starting forward movement notification sound S would be emitted unnecessarily during a period from when the vehicle entered the drivable state until immediately before the vehicle starts moving. Consequently, the starting forward movement notification sound S would be emitted for a long time until the vehicle started moving and would bother people (e.g., pedestrians) in an area surrounding the vehicle. Conversely, if the starting forward movement notification sound S is emitted after the vehicle starts moving, then the starting forward movement notification sound S will not serve its purpose of notification that the vehicle will start moving and the meaning of the notification sound will be diminished.

With this embodiment, however, since the starting forward movement notification sound S is emitted immediately before the vehicle starts moving, such a problem as the starting forward movement notification sound S being emitted for a long time before the vehicle starts moving and confusing people (e.g., pedestrians) in a surrounding area or the meaning of the notification provided by the starting forward movement notification sound S being diminished can be avoided.

Figure 3:
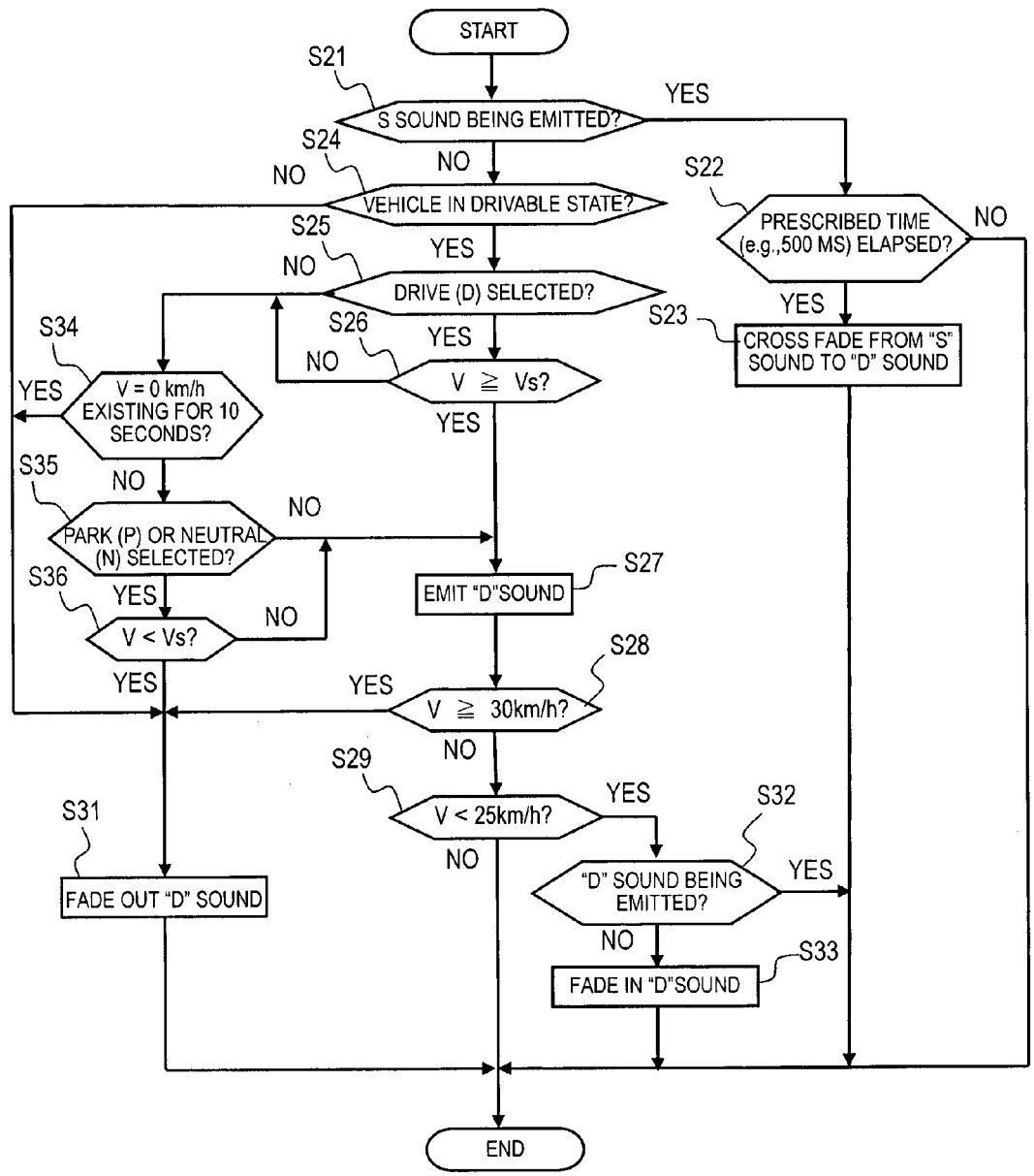
FIG. 3 is a flowchart showing a control program executed by the notification sound controller shown in FIG. 1 in order to control a forward moving notification sound (D sound)

In order to control the forward moving notification sound D, the notification sound controller 12 of FIG. 1 executes the control program shown in FIG. 3. In step S21, the notification sound controller 12 checks if the starting forward movement notification sound S is being emitted by actuation of the cabin exterior speaker 1. If the starting forward movement notification sound S is being emitted, then the controller 12 proceeds to step S22. In step S22, the notification sound controller 12 checks if a prescribed amount of time has elapsed since the starting forward movement notification sound S started to be emitted (e.g., 500 msec). The controller 12 ends the control loop and continues emitting the starting forward movement notification sound S until the prescribed amount of time (500 msec) elapses. Alternatively, in step S22, the prescribed amount of time is a variable amount of time that corresponds to a period from when a driver selects the D range and releases the brake pedal (steps S12 to S14 of FIG. 2), i.e., when the S sound starts being emitted (step S15 of FIG. 2) in response to completion of a movement start preparation operation, until the driver performs a movement start operation. Thus, the prescribed amount of time can be set to any value based on measurement of data or the like, and is not limited to a fixed time period.

When the notification sound controller 12 determines in step S22 that the prescribed amount of time (500 msec) has elapsed since emission of the starting forward movement notification sound S started, i.e., after the starting forward movement notification sound S has been emitted continuously for the prescribed amount of time, the controller 12 proceeds to step S23. In step S23, the notification sound controller 12 executes a cross fade from the starting forward movement notification sound S to the forward moving notification sound D. The control processing of steps S21 to S23 corresponds to a first control section configured to emit the D sound after a prescribed amount of time (e.g., 500 msec or a data measurement) has elapsed since a driver completed a movement start preparation operation that includes a brake disengaging operation while the vehicle was in a stopped state. The cross fade from the starting forward movement notification sound S to the forward moving notification sound D involves gradually lowering a sound pressure level of the starting forward movement notification sound S while gradually increasing a sound pressure level of the forward moving notification sound D (pseudo engine sound) such that the operating state of the cabin exterior speaker 1 gradually changes from the starting forward movement notification sound S to the forward moving notification sound D. As a result, the change from the starting forward movement notification sound S to the forward moving notification sound D can be accomplished without causing a person (e.g., a pedestrian) in a surrounding area to experience an odd feeling about the sounds from the vehicle.

In this embodiment, since the starting forward movement notification sound S is emitted immediately before the vehicle starts moving as described previously with reference to FIG. 2 (steps S12 to S15 in FIG. 2), the starting forward movement notification sound S is emitted at an appropriate timing for notification that the vehicle will start moving. As explained above, the forward moving notification sound D is also emitted at an appropriate timing following the starting forward movement notification sound S. As a result, a situation in which the forward moving notification sound D is emitted long before the vehicle starts moving can be avoided. In this way, the movement notification sound will not cause people (e.g., pedestrians) in a surrounding area to be perplexed and the meaning of the forward movement notification provided by the forward moving notification sound D to be diminished.

If the controller 12 determines in step S21 that the starting forward movement notification sound S is not being emitted from the cabin exterior speaker 1, the controller 12 proceeds to step S24 where the controller 12 checks if the ignition switch 18 is ON, i.e., if the vehicle is in a drivable state. If the controller 12 determines that the vehicle is in a drivable state, then the controller 12 proceeds to step S25. In step S25, the controller 12 checks if the Drive or D range is in a selected state (i.e., if the D range has been selected). If the D range has been selected, then the controller 12 proceeds to step S26. In step S26, the controller 12 determines if the vehicle speed V is equal to or larger than the stop determination vehicle speed Vs, i.e., if the vehicle is moving. If the controller 12 determines that the vehicle is in a drivable state in step S24, that the D range is selected in step S25, and that the vehicle is moving (V≥Vs) in step S26, then the controller 12 proceeds to step S27. In step S27, the controller 12 drives the cabin exterior speaker 1 such that the forward moving notification sound D (pseudo engine sound) is emitted. The control processing of steps S24 to S27 corresponds to a second control section configured to emit the forward moving notification sound D (pseudo engine sound) when the vehicle starts moving in a forward direction before a brake disengaging operation is completed.

The forward moving notification sound D is a pseudo engine sound, as explained previously. The sound volume level of the forward moving notification sound D is held constant. Meanwhile, a frequency of the forward moving notification sound D is set to increase as the vehicle speed increases while remaining within a comparatively high frequency range in which the forward moving notification sound D cannot easily penetrate the cabin interior from outside the cabin. In the first embodiment, the sound volume level is not changed but set to a prescribed constant value (corresponds to a sound volume setting section or device); only the frequency is changed. When the forward moving notification sound D is produced in this way as a pseudo engine sound whose sound pressure level stays constant and whose frequency increases as the vehicle speed increases, a person outside the vehicle can judge a distance to the vehicle based on the volume of the forward moving notification sound D. In particular, as the volume of the forward moving notification sound D becomes larger, the person can determine the vehicle is getting closer. Since the volume of the sound emitted from the vehicle is constant, the sound pressure perceived by a person outside the vehicle differs according to distance. Therefore, a person outside the vehicle can judge the distance between him or her and the vehicle based on a difference in sound pressure. Also, the person can judge a speed of the vehicle based on the pitch of the forward moving notification sound D. The higher the pitch of the forward moving notification sound D is, the higher the vehicle speed is. Thus, based solely on the forward moving notification sound D, the person can know approximately how close the vehicle is and how fast it is approaching.

In step S28, the controller 12 determines if the vehicle speed V has reached or exceeded a prescribed vehicle speed (30 km/h), since movement started. This prescribed vehicle speed (30 km/h) corresponds to a minimum prescribed vehicle speed value at which the forward moving notification sound D is no longer necessary. This prescribed vehicle speed (30 km/h) is also called the D sound fade-out speed. Thus, upon the vehicle reaching the D sound fade out speed, the controller 12 starts fading out the forward moving notification sound D. If the result of step S28 is No, then the controller 12 proceeds to step S29 and determines if the vehicle speed V is below a prescribed D sound fade-in speed. In this embodiment, the prescribed D sound fade-in speed is set to 25 km/h, which is lower than the D sound fade-out speed of 30 km/h (minimum vehicle speed value at which the forward moving notification sound D is not necessary) by a hysteresis amount (5 km/h). If the controller 12 determines in step S28 that since vehicle started moving the vehicle speed V has become equal to or larger than the D sound fade-out speed of 30 km/h, then the controller 12 proceeds to step S31. In step S31, the controller 12 drives the cabin exterior speaker 1 such that the forward moving notification sound D emitted in step S27 gradually decreases and disappears (fades out).

If the controller 12 determines in step S29 that the vehicle speed V is below the D sound fade-in speed of 25 km/h, then the controller 12 proceeds to step S32. In step S32, the controller 12 checks if the forward moving notification sound D is being emitted. If the forward moving notification sound D has been stopped due to executing step S31, then the controller 12 proceeds to step S33 where the controller 12 drives the cabin exterior speaker 1 such that the forward moving notification sound D gradually increases from a sound pressure level of 0 (such that the forward moving notification sound D fades in). If the controller 12 determines in step S32 that the forward moving notification sound D is being emitted, then the controller 12 ends the control loop and continues operating the cabin exterior speaker such that the forward moving notification sound D is emitted.

If the controller 12 determines in step S29 that the vehicle speed V is equal to or higher than the D sound fade-in speed (25 km/h), i.e., if controller 12 determines that the vehicle speed V is in a hysteresis region between the D sound fade-out speed 30 km/h and the D sound fade-in speed 25 km/h, then the controller 12 ends the control loop such that the current operating state of the cabin exterior speaker 1 is maintained and the forward moving notification sound D continues to be emitted in the current manner.

If the controller 12 determines in step S24 that the ignition switch 18 is OFF, i.e., that the vehicle is in a non-drivable state, then the forward moving notification sound D is not necessary and the controller 12 proceeds to step S31. In step S31, the controller 12 drives the cabin exterior speaker 1 such that the forward moving notification sound D fades out.

If the controller 12 determines in step S25 that the D range is not selected or if the controller 12 determines that the D range is still in a selected state but determines that the vehicle is stopped in step S26, then the forward moving notification sound D is not necessary and the controller 12 needs to drive the cabin exterior speaker 1 such that the forward moving notification sound D fades out. However, in this case, the forward moving notification sound D control is handled in a special manner that will now be explained. In step S34, the controller 12 determines if the vehicle speed V has been zero (V=0 km/h) continuously for a prescribed amount of time (10 seconds in this embodiment). If the determination result is Yes in step S34, then the controller 12 proceeds to step S31 and drives the cabin exterior speaker 1 such that the forward moving notification sound D fades out. The prescribed amount of time set in step S34 is preferably the amount of time for determining if the vehicle is waiting at a traffic light or traveling on a congested road. It is acceptable to vary the prescribed amount of time by measuring a stop time occurring on a congested road and setting the prescribed amount of time automatically or by allowing a driver to set the prescribed amount of time manually in consideration of a stop time occurring on a congested road. Alternatively, the prescribed amount of time can be variably set based on information provided by a vehicle navigation system or other information provided to the vehicle about the area in which the vehicle is traveling.

If the controller 12 determines in step S34 that the vehicle is not stopped, i.e., that the vehicle speed V is not equal to 0 km/h, or that the vehicle is in a stopped state but the stopped state has not continued for at least the set amount of time (10 seconds), then the controller 12 proceeds to step S35. In step S35, the controller 12 determines if the vehicle is set to park (P), neutral (N), or another non-driving range. In this illustrated embodiment, step S35 corresponds to a driving continuance intent determining section or device. If the determination result is Yes in step S35, then the controller 12 proceeds to step S36. In step S36, the controller 12 determines if the vehicle speed V is smaller than the stop determination vehicle speed Vs, i.e., if the vehicle can be deemed substantially stopped. If the determination result is Yes in step S36, then the controller 12 proceeds to step S31. In step S31, the controller 12 drives the cabin exterior speaker 1 such that the forward moving notification sound D fades out.

In other words, even if the controller 12 has determined in step S34 that the vehicle is not in a stopped state with the vehicle speed V equal to 0 km/h or that the vehicle is in a stopped state but has not been in the stopped state continuously for at least a set amount of time (10 seconds), the controller 12 still executes a fade out of the forward moving notification sound D (step S31) if the selected range is a non-driving range (park or neutral) (step S35) and the vehicle speed V is below the stop determination vehicle speed Vs (step S36).

However, if the selected range is determined not to be a non-driving range (park or neutral) in step S35, or if the selected range is determined to be a non-driving range (park or neutral) in step S35 but the vehicle speed V is determined to be equal to or larger than the stop determination vehicle speed Vs (i.e., the vehicle is determined to be moving) in step S36, then it is necessary to emit the forward moving notification sound D. Thus, the controller 12 proceeds to step S27 where the controller 12 continues to drive the cabin exterior speaker 1 such that the forward moving notification sound D is emitted.

When the range is changed from the D range to a non-driving range (park or neutral), there is a possibility that the vehicle will still move due to inertia. Thus, the apparatus is configured to continue emitting the forward moving notification sound D from the cabin exterior speaker 1 when the selected range is determined to be a non-driving range (park or neutral) in step S35 but the vehicle speed V is determined to be equal to or larger than the stop determination vehicle speed Vs (i.e., the vehicle is determined to be moving) in step S36. In this way, a person who is in a vicinity of a front end portion of the vehicle when the vehicle moves due to inertia in such a case can be urged to exercise caution by the movement notification sound.

this embodiment, when the controller 12 determines that the D range is not in a selected state in step S25 or when the D range is still in a selected state but the controller 12 determines that the vehicle is stopped in step S26, the controller does not proceed immediately to step S31 and fade the forward moving notification sound D out. Instead, the controller 12 continues emitting the forward moving notification sound D until it executes step S34 and only then proceeds to step S31. In step S31, the controller 12 fades the forward moving notification sound D out if the controller 12 determines that the vehicle speed V has equaled 0 km/h, i.e., that the vehicle has been in a stopped state, for a set amount of time (10 seconds). Thus, when the vehicle is on a congested road or in another situation in which the vehicle stops but the vehicle speed V does not remain at 0 km/h (stopped state) for the set amount of time (10 seconds), an annoying situation can be avoided in which the forward moving notification sound D fades out and then again emitted in accordance with the starting forward movement notification sound S control shown in FIG. 2 (step S15) every time the vehicle stops. In order to achieve this objective even more effectively, it is acceptable to vary the prescribed amount of time by measuring a stop time occurring on a congested road and setting the prescribed amount of time automatically or by allowing a driver to set the set amount of time manually in consideration of a stop time occurring on a congested road.

In this embodiment, the starting forward movement notification sound S is emitted in step S15 of FIG. 2 when the controller 12 is determined in step S13 or step S14 that the brake pedal has been released and the brake switch 15 has changed from ON to OFF. Consequently, when the brake pedal is being released gradually from a depressed state but the brake pedal has not yet been released, the starting forward movement notification sound S is not emitted, i.e., the step S15 is not executed, until the brake switch 15 changes from ON to OFF.

During a slow brake pedal return operation, there is a possibility that the braking force will decline and the vehicle will start moving due to, for example, a creep force or a downward slope of a road surface. Therefore, it is necessary to warn a person in a vicinity of the vehicle if the vehicle starts to move. However, since a notification of a vehicle starting to move in this manner would occur after the vehicle has started to move, the forward moving notification sound D is more appropriate than the starting forward movement notification sound S.

In this embodiment, as shown in FIG. 3, the controller 12 proceeds from step S21 of FIG. 3 to steps S24 to S26 during a situation in which the brake pedal is undergoing a slow return operation such that the starting forward movement notification sound S is not emitted. If the controller 12 determines in step S26 that the vehicle speed V is equal to or larger than the stop determination vehicle speed Vs, i.e., that the vehicle is moving, then the controller proceeds to step S27 and emits the forward moving notification sound D. Consequently, the forward moving notification sound D is emitted instead of the starting forward movement notification sound S when the vehicle starts moving while the brake pedal is undergoing a slow return operation. As a result, when the vehicle starts moving during a slow brake return operation as explained above, a person in a surrounding area can be warned reliably with the more appropriate forward moving notification sound D instead of the starting forward movement notification sound S.

Figure 4:
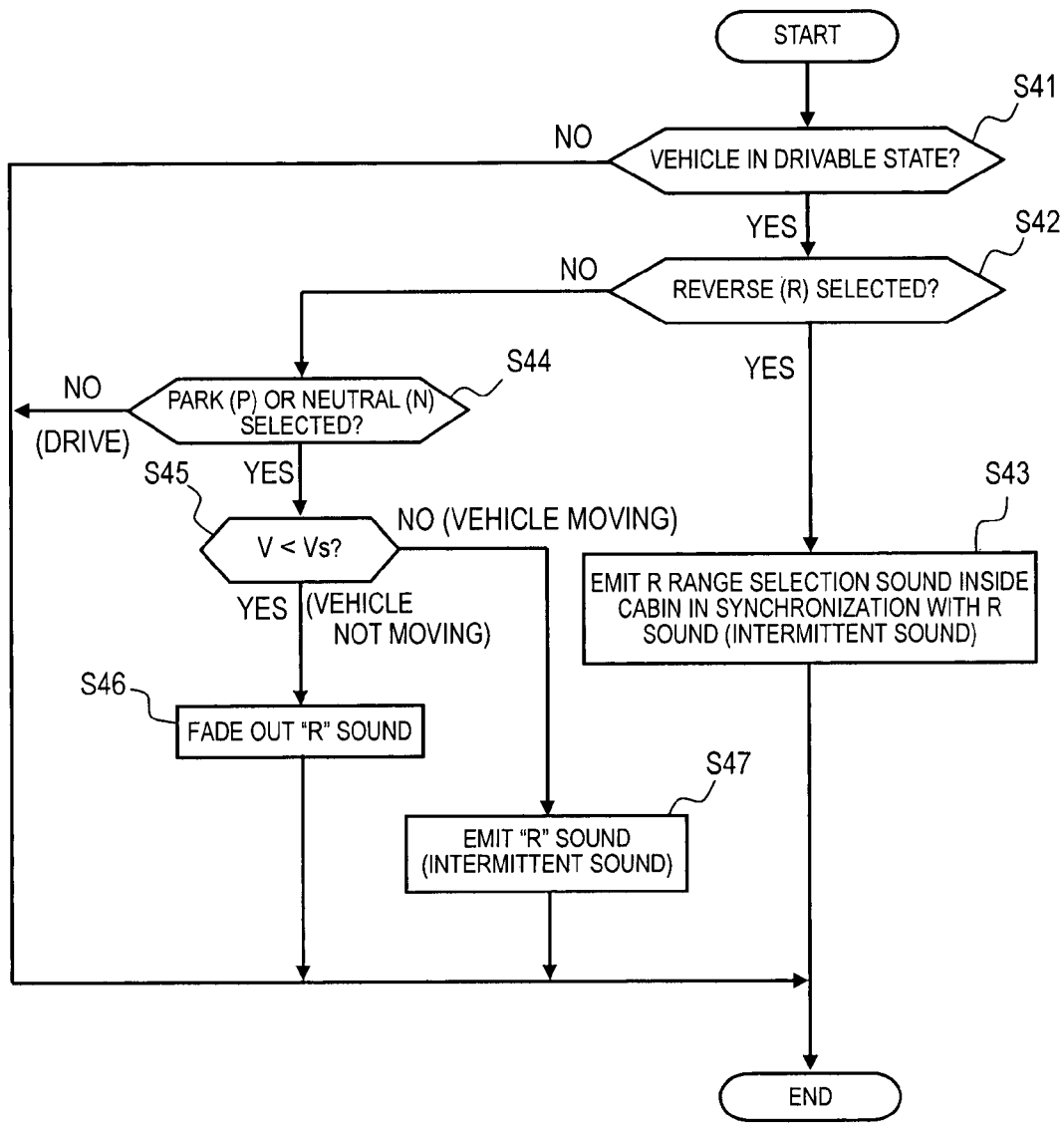
FIG. 4 is a flowchart showing a control program executed by the notification sound controller shown in FIG. 1 in order to control a reverse movement notification sound (R sound)

In order to control the reverse movement notification sound R (R sound), the notification sound controller 12 executes the control program shown in FIG. 4. In step S41, the controller 12 checks if the ignition switch 18 is ON, i.e., if the vehicle is in a drivable state. If the vehicle is in a drivable state, then the controller 12 proceeds to step S42. In step S42, the controller 12 checks if vehicle has been placed in reverse (i.e., if the range is set to the R range). If the vehicle is in reverse (R range), then the controller 12 proceeds to step S43. In step S43, the controller 12 drives the cabin exterior speaker 1 such that the reverse movement notification sound R is emitted. Thus, the reverse movement notification sound R is emitted before the vehicle actually starts moving.

Thus, when the ignition switch 18 is ON, i.e., the vehicle is in a drivable state, (step S41) and the vehicle is in reverse, i.e., the R range (step S42), the reverse movement notification sound R is emitted from the cabin exterior speaker 1 immediately (step S43). Since the reverse movement notification sound R is emitted from the cabin exterior speaker 1 immediately when the vehicle is in reverse, i.e., the R range (steps S42 and S43), an "R range selection notification sound" is emitted from the cabin interior speaker 11 simultaneously while the vehicle is in reverse (R range), as explained previously.

As explained previously, since the reverse movement notification sound R emitted from the cabin exterior speaker 1 in step S43 serves to convey the same type of vehicle information as the R range selection notification sound emitted from the cabin interior speaker 11, the reverse movement notification sound R emitted from the cabin exterior speaker 1, too, is configured to be an intermittent sound. The reverse movement notification sound R (intermittent sound) is controlled to be synchronized with the intermittent R range selection notification sound emitted from the cabin interior speaker 11. Thus, in this embodiment, step S43 constitutes cabin interior-exterior notification sound synchronizing section.

It is also acceptable if, conversely, the intermittent R range selection notification sound emitted from the cabin interior speaker 11 is synchronized with the reverse movement notification sound R (intermittent sound) emitted from the cabin exterior speaker 1.

Either way, the reverse movement notification sound R (intermittent sound) emitted from the cabin exterior speaker 1 and the R range selection notification sound emitted simultaneously from the cabin interior speaker 11 are synchronized and the R sound from the cabin exterior speaker 1 (which the driver does not need to hear) is overlaid with the intermittent R range selection notification sound from the cabin interior speaker 11 such that the driver cannot hear it. Thus, the problem of the driver hearing and being annoyed by the unnecessary R sound emitted from the cabin exterior speaker 1 can Additionally, since the reverse movement notification sound R (intermittent sound) is synchronized with the intermittent R range selection notification sound, the intermittent periods when neither the reverse movement notification sound R (intermittent sound) from the cabin exterior speaker 1 nor the intermittent R range selection notification sound from the cabin interior speaker 11 can be heard, i.e., the periods when the driver can easily hear another notification sound, are longer. Thus, during these longer quiet periods, such other notification sounds as the obstacle proximity notification sound and the seatbelt notification sound mentioned previously can be heard by a driver. In this way, the driver can recognize the notification sounds immediately and obtain the corresponding information reliably, which is greatly advantageous from a safety standpoint.

If the controller 12 determines in step S41 that the ignition switch 18 is OFF, i.e., that the vehicle is in a non-drivable state, then the vehicle cannot move in reverse and it is not necessary to emit the R sound. Therefore, the controller 12 ends the control loop directly and skips step S43 such that the R sound is not emitted (i.e., the cabin exterior speaker 1 is put into a non-driven state).

If the controller 12 determines in step S42 that the R range is not selected, then the controller 12 proceeds to step S44 and determines if a non-driving range (park or neutral) is selected. If the controller 12 determines that the vehicle is not set to a non-driving range (park or neutral), i.e., that the D range is selected, then it is not necessary to emit the reverse movement notification sound R and the controller 12 ends the control loop directly, thereby skipping step S43 such that the reverse movement notification sound R is not emitted (i.e., the cabin exterior speaker 1 is put into a non-driven state).

If the controller 12 determines in step S44 that the vehicle is set to a non-driving range (park or neutral), then the controller 12 proceeds to step S45 and checks if the vehicle speed V is smaller than the stop determination vehicle speed Vs, i.e., if the vehicle can be deemed substantially stopped. If the controller 12 determines that the vehicle is substantially stopped, then the controller 12 proceeds to step S46. In step S46, the controller 12 drives the cabin exterior speaker 1 such that the reverse movement notification sound R emitted in step S43 gradually decreases until it disappears (fades out).

However, if the controller 12 determines that the vehicle is in a non-driving range (park or neutral) in step S44 but that the vehicle speed V is not smaller than the stop determination vehicle speed Vs (i.e., the vehicle is not substantially stopped but determined to be moving), then the controller 12 determines that the vehicle is moving in reverse even though it is in a non-driving range (park or neutral) and proceeds to step S47. In step S47, the controller 12 continues driving the cabin exterior speaker 1 such that the reverse movement notification sound R is started emitting in step S43 continues to be emitted. In this way, in a situation in which the vehicle continues moving in reverse due to inertia after the range is changed from the R range to a non-driving range (park or neutral), the reverse movement notification sound R can continue to be emitted from cabin exterior speaker 1. In this way, a person near a rear end portion of the vehicle can be reliably warned that the vehicle is moving backward and be urged to exercise caution.

A situation in which the reverse movement notification sound R is emitted in step S47 can only occur if the controller 12 has determined in step S42 that the R range is not in a selected state. In such a situation, as should be clear from the previous explanation, the R range selection notification sound is not emitted from the cabin interior speaker 11 and, thus, it is not necessary to synchronize an R range selection notification sound emitted from the cabin interior speaker 11 with the R sound from the cabin exterior speaker 1 as is done in step S43.

As explained previously with reference to FIGS. 2 and 3, the forward moving notification sound D is emitted when a prescribed amount of time, e.g., 500 msec, has elapsed (step S22 of FIG. 3) since the starting forward movement notification sound S started being emitted (step S15 of FIG. 2) in response to the D range being selected by a driver from a stopped state (step S11 of FIG. 2) and an operation being performed by the driver in preparation to start the vehicle into motion, e.g., releasing the brake pedal, (steps S12 to S14 of FIG. 2). Conversely, as explained previously with reference to FIG. 4, the reverse movement notification sound R is emitted immediately (step S43 of FIG. 4) when the driver selects the R range (step S42 of FIG. 4). The reason the reverse movement notification sound R is emitted immediately will now be explained.

A vehicle is intended chiefly for driving forward and driving in reverse is more difficult for a driver than driving forward. Moreover, a person (e.g., a pedestrian) in a surrounding area of a vehicle tends to assume that a vehicle typically moves in a forward direction and naturally exercises caution with respect to forward movement of a vehicle. Conversely, a person does not expect a vehicle to move in reverse and tends to exercise less caution in anticipation of reverse movement.

In short, the reverse movement notification sound R is intended as a notification of reverse movement indicating movement in a direction a driver is less accustomed to and a direction a person (e.g., a pedestrian) in a surrounding area is less likely to expect. Therefore, from a safety standpoint, it is preferable for the reverse movement notification sound R to be emitted as early as possible to urge people in a surrounding area to exercise caution. Conversely, the forward moving notification sound D is intended as a notification of forward movement indicating movement in a direction a driver is more accustomed to and a direction a person (e.g., a pedestrian) in a surrounding area is more likely to expect as a natural direction for a vehicle to move. Moreover, as explained previously, the forward moving notification sound D is a pseudo engine sound and it is better to keep an emission time of the forward moving notification sound D as short as possible in order to ensure the quietness of the vehicle. Therefore, it is preferable for the forward moving notification sound D to be emitted as late as possible.

Thus, as mentioned above, each notification sound (the S sound, the D sound and the R sound) is emitted under different respective vehicle conditions in this embodiment. In particular, in this embodiment, the apparatus is configured such that the reverse movement notification sound R is emitted immediately (step S43 of FIG. 4) when a driver performs an operation selecting the R range (step S42 of FIG. 4). Also, in this embodiment, the apparatus is configured such that the forward moving notification sound D is emitted after a prescribed amount of time, since the software phone-like sound of the starting forward movement notification sound S was started being emitted (step S15 of FIG. 2) in response to the D range being selected by a driver from a stopped state (step S11 of FIG. 2) and an operation being performed by the driver in preparation to start the vehicle into motion, e.g., releasing the brake pedal, (steps S12 to S14 of FIG. 2). By configuring the apparatus in this way, the notification sounds emitted for forward movement and reverse movement can each be emitted at a necessary timing and for a necessary period of time without confusing a person (e.g., a pedestrian) in a surrounding area by emitting unnecessary notification sounds. In this embodiment, steps S12 to S15 of FIG. 2 constitute a notification sound emission timing section.

By determining an emission timing of the forward movement notification sound and an emission timing of the reverse movement notification sound as explained above, both the forward movement notification sound and the reverse notification sound can be emitted at the required timings described previously. As a result, a forward movement notification sound does not disrupt the quietness of the vehicle or annoy a driver by being emitted too early, and a person in an outside area surrounding the vehicle can be notified appropriately of an advancement direction in which the vehicle will move.

There are situations in which a notification sound (e.g., the S sound, the D sound, and the R sound) emitted from the cabin exterior speaker 1 like the starting forward movement notification sound S, the forward moving notification sound D, or the reverse movement notification sound R could be an annoying disturbance to others, such as late at night or in a residential neighborhood. In such a situation, a driver can issue a notification sound prohibition command by pressing the mute switch 16 shown in FIG. 1. The mute switch 16 is configured to issue a notification sound prohibition command each time it is pressed such that it enters an ON state. When it is not being pressed, it automatically resumes a normal position (OFF position).

Figure 5:
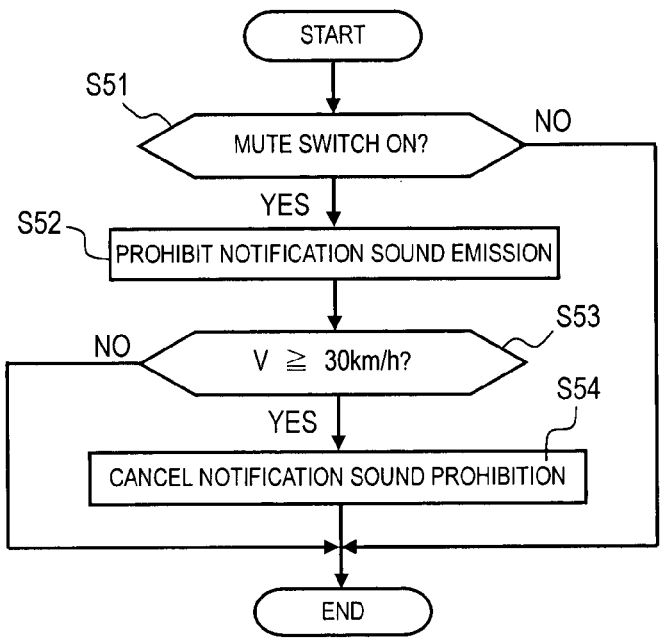
FIG. 5 is a flowchart showing a control program executed by the notification sound controller shown in FIG. 1 in order to prohibit emitting a notification sound from the notification sound emitting device.

When the controller 12 receives the notification sound prohibition command from the mute switch 16, the controller 12 shown in FIG. 1 executes a control program shown in FIG. 5 and prohibits emission of notification sounds (the S sound, the D sound and the R sound) as will now be explained.

In step S51, the controller 12 checks if the mute switch 16 has been turned ON, i.e., if the notification sound prohibition command has been issued. If the mute switch 16 is not ON (if the notification sound prohibition command has not been issued), then the controller 12 ends the control loop and does not execute a prohibition of the notification sounds. As a result, the notification sounds are emitted as explained previously with reference to FIGS. 2 to 4.

If the controller 12 determines in step S51 that the mute switch 16 has been turned ON (that the notification sound prohibition command has been issued), then the controller 12 proceeds to step S52. In step S52, the controller 12 prohibits the emission of notification sounds such that the notification sounds (the S sound, the D sound and the R sound) are not emitted from the cabin exterior speaker 1 regardless of the state of the controls shown in FIGS. 2 to 4.

Next, in step S53, the controller 12 determines if the vehicle speed V is equal to or larger than the 30 km/h, which is a minimum vehicle speed value at which the forward moving notification sound D is not necessary (D sound fade-out vehicle speed) as explained previously regarding step S28 of FIG. 3. If the result of this determination is No in step S53, then the controller 12 ends the control loop and continues the notification sound emission prohibition started in step S52. If the controller 12 determines in step S53 that the vehicle speed V is equal to or larger than the D sound fade-out speed (30 km/h), then the controller 12 proceeds to step S54. In step S54, the controller 12 cancels the notification sound emission prohibition started in step S52, thereby allowing the notification sounds (the S sound, the D sound and the R sound) to be emitted from the cabin exterior speaker 1 in accordance with the controls shown in FIGS. 2 to 4.

With the notification sound prohibition control just described, a driver can prohibit the emission of notification sounds (the S sound, the D sound and the R sound) from the cabin exterior speaker 1 (step S52) regardless of the state of the controls shown in FIGS. 2 to 4 by pressing the mute switch 16 (step S51). Thus, emission of the notification sounds can be prevented in situations where a notification sound emitted from the cabin exterior speaker 1, i.e., the starting forward movement notification sound S, the forward moving notification sound D, or the reverse movement notification sound R, could be an annoying disturbance to other people (e.g., pedestrians) in a surrounding area, such as late at night or in a residential neighborhood.

However, if the emission of notification sounds continues to be prohibited after the driver presses the mute switch 16, then the notification sounds will not be emitted even after the vehicle has traveled to an area where the notification sounds will not be a disturbance and the apparatus will not serve its purpose as a safety device. Therefore, in this embodiment, if the vehicle speed V reaches or exceeds the D sound fade-out speed (30 km/h) (step S53), then the controller 12 determines that the vehicle has traveled to a place where the notification sounds will not disturb anyone and cancels the notification sound emission prohibition (step S54). In this way, the notification sounds (the S sound, the D sound and the R sound) can be emitted from the cabin exterior speaker 1 in accordance with the controls shown in FIGS. 2 to 4.

By canceling the prohibition in this way, a situation in which the notification sounds are not emitted even after the vehicle has traveled to a place where the notification sounds will not disturb anyone be avoided and the notification apparatus can serve its purpose as a safety apparatus.

In this embodiment, the vehicle speed V reaching or exceeding the D sound fade-out speed (30 km/h) is used as a condition for canceling the notification sound prohibition. Certain operational effects can be obtained by contriving the apparatus to determine that the vehicle has traveled to a place where the notification sounds will not disturb anyone and cancel the notification sound prohibition when that condition is satisfied. Those effects will now be explained.

If the condition for canceling the notification sound prohibition is set to a vehicle speed V that is slower than the forward moving notification sound D fade out vehicle speed (30 km/h), then it will be possible for the prohibition to be canceled while the vehicle is still in a place where the notification sounds could disturb other people in a surrounding area. More specifically, as explained previously, the region of low vehicle speeds below 30 km/h is the region in which the apparatus is configured to emit the forward moving notification sound D. Meanwhile, it is in this same low vehicle speed region that a driver might press the mute switch 16 (turns it ON) to prohibit the notification sounds from being a disturbance. If the cancellation condition is a vehicle speed in this low vehicle speed region, then the notification sound prohibition might be cancelled immediately after a driver releases his or her finger from the mute switch 16, thus allowing a notification sound to disturb a person (e.g., a pedestrian) in a surrounding area of the vehicle.

In this embodiment, however, the condition for cancelling the notification sound prohibition is that the vehicle speed V is equal to or larger than the D sound fade-out speed (30 km/h) and the notification sound prohibition is cancelled when this condition is satisfied. Consequently, when a driver turns the mute switch 16ON while the vehicle speed V is below the D sound fade-out speed (30 km/h) (i.e., while the vehicle speed is in a low vehicle speed region where the forward moving notification sound D is emitted), the prohibition of the notification sounds is not cancelled when the driver's finger leaves the mute switch 16. Instead, the prohibition continues and the problem of a notification sound being emitted while the vehicle is traveling in a place where the notification sound can be a disturbance to a person (e.g., a pedestrian) in a surrounding area can be avoided.

When the vehicle is traveling in an area surrounding a manufacturing plant, a busy shopping area, or other noisy place (e.g., a place where a noise level is high), it may be difficult for a person (e.g., a pedestrian) in a surrounding area to hear the starting forward movement notification sound S, the forward moving notification sound D, the reverse movement notification sound R or other notification sound emitted from the cabin exterior speaker 1 and difficult for the purpose of the notification to be accomplished if the notification sound is emitted at a standard sound pressure level. In such a situation, a driver can issue a notification sound volume increase command by pressing a sound volume increasing switch 17 shown in FIG. 1. The sound volume increasing switch 17 is configured to issue a notification sound volume increase command each time it is pressed such that it enters an ON state. When it is not being pressed, it automatically resumes a normal position (OFF position).

Figure 6:
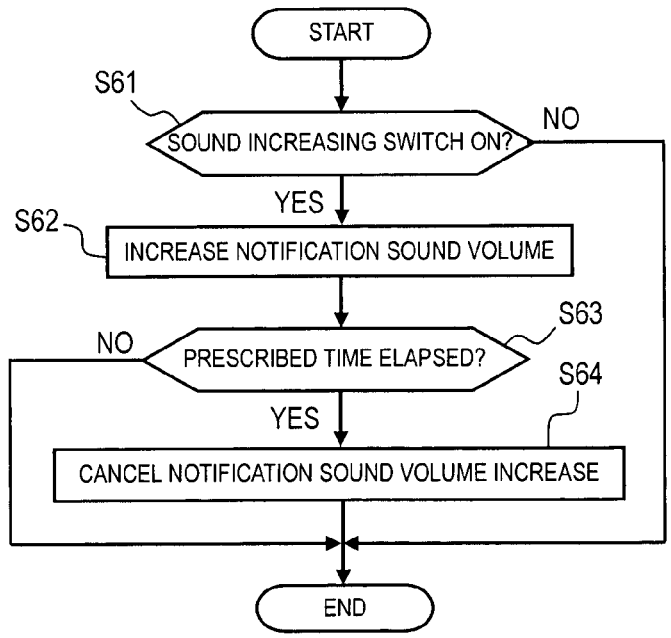
FIG. 6 is a flowchart showing a control program executed by the notification sound controller shown in FIG. 1 in order to increase a volume of a notification sound emitted from the notification sound emitting device.

When the controller 12 receives the notification sound volume increase command from the sound volume increasing switch 17, the notification sound controller 12 shown in FIG. 1 executes a control program shown in FIG. 6 and increases the volume of the notification sounds as will now be explained. In step S61, the controller 12 checks if the sound volume increasing switch 17 has been turned ON, i.e., if the notification sound volume increase command has been issued. If the sound volume increasing switch 17 is not ON (if the notification sound volume increase command has not been issued), then the controller 12 ends the control loop and does not execute a volume increase of the notification sounds. As a result, the notification sounds are emitted as explained previously with reference to FIGS. 2 to 4 and the sound pressure level of the notification sounds remains at a standard value.

If the controller 12 determines in step S61 that the sound volume increasing switch 17 is ON (i.e., that the notification sound volume increase command has been issued), then the controller 12 proceeds to step S62 and increases the volume of the notification sounds such that a notification sound (S sound, D sound, or R sound) emitted from the cabin exterior speaker 1 in accordance with the controls explained in FIGS. 2 to 4 is emitted at a higher sound pressure level than the standard value.

In step S63, the controller 12 determines if a prescribed amount of time (e.g., one minute) has elapse since the sound volume increasing switch 17 was turned ON (i.e., since the notification sound volume increase command was issued). If the determination result is No, i.e., if the prescribed amount of time still has not elapsed since the sound volume increasing switch 17 was turned ON (i.e., since the notification sound volume increase command was issued), then the controller 12 ends the control loop and continues executing the notification sound volume increase started in step S62. When the controller 12 determines in step S63 that the prescribed amount of time has elapsed since the sound volume increasing switch 17 was turned ON (i.e., since the notification sound volume increase command was issued), the controller 12 proceeds to step S64 and cancels the notification sound volume increase executed in step S62, thereby lowering the sound pressure level of the notification sounds (the S sound, the D sound and the R sound) emitted from the cabin exterior speaker 1 in accordance with the controls shown in FIGS. 2 to 4 back to the standard value.

With the notification sound volume increase control described above, when the vehicle is traveling at or in an area surrounding a manufacturing plant, a busy shopping area, or other noisy place where it may be difficult for a person in a surrounding area to hear a notification sound emitted from the cabin exterior speaker 1, a driver can increase a volume of the notification sounds by pressing the sound volume increase switch 17 (step S61) such that the controller increases a sound pressure level (step S62) of the notification sounds (the S sound, the D sound and the R sound) emitted from the cabin exterior speaker 1 in accordance with the controls shown in FIGS. 2 to 4. In this way, a person in a surrounding area is enabled to hear a notification sound emitted from the cabin exterior speaker 1 even at or in an area surrounding a manufacturing plant, a busy shopping area, or other noisy place.

If the increased volume state of the notification sounds were to continue after the sound volume increasing switch 17 is pressed by a driver, then the notification sounds would be too loud when the vehicle traveled to a residential area or other less noisy place (i.e., a place with a low noise level) and become a disturbance to people in a surrounding area. In particular, in this embodiment, the forward moving notification sound D is a pseudo engine sound in a comparatively high frequency range that does not readily enter the cabin interior from outside the cabin. Since the forward moving notification sound D is difficult for a driver inside the cabin to hear, it is easy for the driver to forget to return (lower) the volume level. Therefore, this embodiment is configured to cancel the volume increase of the notification sounds (step S64) when a prescribed amount of time has elapsed (step S63) since the sound volume increasing switch 17 was turned on (i.e., since the notification sound volume increase command was issued), thereby lowering the sound pressure level of the notification sounds (the S sound, the D sound and the R sound) emitted from the cabin exterior speaker 1 in accordance with the controls shown in FIGS. 2 to 4 back to a standard level.

Thus, it is assumed that by the time the prescribed amount of time has elapsed since the sound volume increasing switch 17 was turned ON, the vehicle will have traveled to a less busy suburban area, residential area, or other quieter place. By lowering the notification sounds (the S sound, the D sound and the R sound) emitted from the cabin exterior speaker 1 back to the standard sound pressure level, the increased volume of the notification sounds resulting when the sound volume increasing switch 17 is turned ON can be prevented from disturbing people in a near the vehicle when the vehicle is in a quieter place.

The operational effects of a notification sound emitting apparatus according to this embodiment will now be explained.

If the vehicle is an engine-driven vehicle that uses only an engine as a power source, then when the vehicle is stopped but in a drivable state (i.e., in a state in which the starting forward movement notification sound S would be emitted), a pedestrian near the vehicle can recognize that the vehicle could possibly start into motion based on the idling sound of the engine. However, if the vehicle is an electric car or in a traveling mode in which only an electric motor is used as a power source, then an operating sound of the vehicle is quiet and it is difficult for a pedestrian to recognize that the vehicle could possibly start moving forward from a stopped state. Therefore, when the vehicle is stopped, it is necessary to inform pedestrians that the vehicle might start moving forward.

Therefore, in the first embodiment, the starting forward movement notification sound S is emitted when the results of step S12, step S13, and step S14 are all Yes, i.e., when the driver has completed a D range selecting operation and a brake disengaging operation (such that the brake switch 15 turns OFF). Normally, when a driver is going to start driving a vehicle forward, the driver changes the selected range from the P range to the D range while depressing the brake pedal and then the driver moves his or her foot from the brake pedal to the accelerator pedal and depresses the accelerator pedal. Thus, by detecting if both the D range selecting operation and the brake disengaging operation have been completed, the apparatus can detect if the driver has completed operations in preparation for driving forward and is waiting to depress the accelerator, i.e., if the vehicle is in a state corresponding to a time immediately before the vehicle starts moving. By emitting the starting forward movement notification sound S when the D range selecting operation and the brake disengaging operation have been completed, pedestrians in a surrounding area of the vehicle can be informed that the vehicle will start moving forward from a stop.

In a vehicle notification sound emitting apparatus according to the previously explained embodiment, the S sound portion of the forward advancement notification sound is emitted (as explained previously) when the D range has been selected and a movement start preparation operation, e.g., releasing the brake pedal, has been performed (steps S12 to S14 of FIG. 2) by a driver from a stopped state (step S11 of FIG. 2), and the D sound portion of the forward advancement notification sound is emitted (as explained previously) after a prescribed amount of time, e.g., 500 msec, has elapsed (step S22 of FIG. 3) since the S sound started being emitted (step S15 of FIG. 2). As a result, the operational that will now be explained can be achieved.

The R sound emitted as a reverse movement notification sound is a notification sound regarding movement in a direction a driver is less accustomed to and a direction a person in an outside area surrounding the vehicle is less likely to expect. Therefore, from a safety standpoint, it is preferable for the R sound to be emitted as early as possible to urge people in a surrounding area to exercise caution. Conversely, a forward advancement notification sound (S sound or D sound) emitted as a notification of forward movement is a notification sound regarding movement in a direction a driver is more accustomed to and a direction a person in an outside area surrounding the vehicle is more likely to expect as a natural direction for a vehicle to move. Therefore, it is acceptable for the forward advancement notification sound to be emitted later and preferable for the D sound to be emitted as late as possible from the stand point of ensuring the quietness of the vehicle.

In this embodiment, the emission timing of the forward advancement notification sound (S sound and D sound) is configured such that the forward advancement notification sound (starting with the S sound) is emitted (step S15 of FIG. 2) when a forward movement shift operation changing the range to the D range and a movement start preparation operation (a brake pedal release operation in the example shown in the figures) have been performed (steps S12 to S14 in FIG. 2). In other words, the forward advancement notification sound is not emitted when the vehicle has merely been put into a drivable state. As a result, when the vehicle has been put into a drivable state but does not start moving for a while, the forward advancement notification sound is not emitted unnecessarily and a person in an outside area surrounding the vehicle is not subjected to the annoyance of listening to an unnecessary forward advancement notification sound for a long period of time. Furthermore, the quietness of the vehicle is not degraded and a driver can be protected from the annoyance of hearing an unnecessary notification sound.

In this embodiment, since the apparatus first emits the software phone sound (the S sound-step S15 of FIG. 2) when the driver has selected the D range and completed a movement start preparation operation, e.g., releasing the brake pedal (steps S12 to S14 of FIG. 2), a person in an outside area surrounding the vehicle can be warned that the vehicle will be starting into forward motion with the soft S sound when the movement start preparation operation is completed (immediately before the vehicle starts moving).

As explained previously, the D sound is emitted (step S23 of FIG. 3) when a prescribed amount of time (step S22 of FIG. 3) has elapsed since the S-sound started (step S15 of FIG. 2) in response to completion of the movement start preparation operation (steps S12 to S14 of FIG. 2), and the prescribed amount of time is set to correspond to an amount of time that will elapse between when the movement start preparation operation is completed and when a movement start operation is performed. As a result, the effect of a person in an outside area surrounding the vehicle not being subjected to the annoyance of the forward advancement notification sound (S sound and D sound) being emitted unnecessarily and for a long period of time can be avoided even more reliably. Furthermore, the quietness of the vehicle is not degraded and a driver can be protected from the annoyance of hearing an unnecessary notification sound.

With the control program for the starting forward movement notification sound (S sound) shown in FIG. 2, during a period when a driver is gradually returning the brake pedal from a depressed state toward a released state but has not yet released the brake pedal, the controller 12 skips step S15 and does not emit the starting forward movement notification sound S (the S sound) because the brake switch 15 has not yet changed from ON to OFF. During a brake pedal return operation like that described above, there is a possibility that the braking force will decline and the vehicle will start moving due to, for example, a creep force or a downward slope of a road surface. In this kind of situation, too, it is necessary to warn pedestrians in a vicinity of the vehicle. However, since a notification of a vehicle starting to move in this manner would occur after the vehicle has started to move, the forward moving notification sound D (the D sound), which serves to notify of movement in progress, is more appropriate than the starting forward movement notification sound S (the S sound), which indicates a state immediately before movement starts). Additionally, since the vehicle is moving slowly with a brake force applied, emitting the S sound could possibly give pedestrians in the surrounding area a false impression that the vehicle will start moving rapidly (while accelerating).

Therefore, in this embodiment, as shown in FIG. 3, when the vehicle starts moving forward due to a slow brake return operation during which the starting forward movement notification sound S is not emitted, the controller 12 proceeds from step S21 of FIG. 3 to steps S24 through S26. Then, when the vehicle speed V is determined to be equal to or larger than the stop determination vehicle speed Vs in step S26, the controller 12 proceeds to step S27 and emits the forward moving notification sound D.

Thus, when a driver performs a gradual return operation of the brake pedal while the vehicle is in a stopped state and the vehicle starts moving due to a diminished braking force, the starting forward movement notification sound S is canceled and the D sound is emitted immediately so that a pedestrian in the surrounding area can be warned of the vehicle movement by the forward moving notification sound D (which is intended to warn of movement in progress) instead of the less appropriate the starting forward movement notification sound S (which is intended to warn of impending movement). Also, since the S sound, which is normally emitted immediately before movement starts, is not emitted, pedestrians in a surrounding area can recognize that the vehicle is moving slowly.

In this embodiment, as explained previously, the S sound is a notification sound set to a prescribed region of comparatively low frequencies that easily penetrate the cabin interior from outside the cabin. If the driver were to mistakenly think that the starting forward movement notification sound S had been emitted while the driver was slowly returning the brake pedal in the manner explained above, then the driver might start driving while believing that any person in a surrounding area of the vehicle had been warned by the S sound that the vehicle would be starting into motion. This would be undesirable from a safety perspective.

The apparatus is configured such that when a driver completes a start movement preparation operation that includes a brake disengaging operation (turning the brake switch 15 OFF) while the vehicle is in a stopped state, the starting forward movement notification sound S is emitted emit to inform a person in a surrounding area of a vehicle that the vehicle will be starting to move in a forward direction. Following the S sound, the forward moving notification sound D is emitted to inform a person in the surrounding area of the vehicle that the vehicle is moving forward. As a result, a person in a surrounding area of a vehicle can be informed that the vehicle will be starting to move in a forward direction from a stopped state.

The apparatus is further comprised to emit the forward moving notification sound D when the vehicle starts moving forward before the brake disengaging operation is completed (i.e., before the brake switch 15 turns OFF). As a result, the forward moving notification sound D can be emitted to provide a reliable notification when the vehicle has started slowly into motion. In such a case, the forward moving notification sound D is more appropriate than the starting forward movement notification sound S because the forward moving notification sound D is intended as a movement notification while the starting forward movement notification sound S is intended as a movement start notification.

The notification sound controller 12 is provided with a first control section configured to emit the forward moving notification sound D after a prescribed amount of time (500 msec) has elapsed since a driver completed a movement start preparation operation that includes a brake disengaging operation while the vehicle was in a stopped state (steps S21 to S23) and a second control section configured to emit the forward moving notification sound D when the vehicle starts moving in a forward direction before a brake disengaging operation is completed (steps S24 to S27). Since the forward moving notification sound D is emitted when a prescribed amount of time has elapsed since a movement start preparation operation was completed, a person in an area surrounding a vehicle can be informed that the movement start preparation operation has been completed and the vehicle will be starting to move in a forward direction from a stopped state. Also, since the forward moving notification sound D is emitted when the vehicle starts moving in a forward direction before the movement start preparation is completed, a person in the surrounding area can informed with the forward moving notification sound D that the vehicle has slowly started moving from a state in which a brake was not completely disengaged.

While only selected embodiments have been chosen to illustrate the present invention, it will be apparent to those skilled in the art from this disclosure that various changes and modifications can be made herein without departing from the scope of the invention as defined in the appended claims. For example, although the previously explained embodiment presents the idea of using both the starting forward movement notification sound S (the S sound) and the forward moving notification sound D (the D sound), as already explained, for forward movement of the vehicle, this idea can also be applied to reverse movement of the vehicle. In other words, the reverse movement notification sound (R) can be modified to include two different reverse notification sounds similar to the S and D sounds used in the movement notification of forward movement in a similar manner as previously explained to obtain a similar effect. Also it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the vehicle notification sound emitting apparatus are provided for illustration only, and not for the purpose of limiting the invention as defined by the appended claims and their equivalents.

What is claimed is:

1. A vehicle notification sound emitting apparatus comprising:
    a sound emitting device configured to emit a starting movement notification sound to outside of a vehicle to inform a person in an outside area surrounding the vehicle that the vehicle will transition from a stopped state to a moving state, and emit a moving notification sound to outside of the vehicle to inform a person in the outside area surrounding the vehicle that the vehicle is moving; and
    a notification sound control device configured to operate the sound emitting device to selectively emit the starting movement notification sound, the notification sound control device including a notification sound emission timing section configured to set a start timing of the starting movement notification sound in response to a shift operation, which issues a vehicle movement command, having been performed and an additional start movement preparation operation of the vehicle having been performed, the notification sound control device being further configured to operate the sound emitting device to automatically emit the moving notification sound after the starting movement notification sound has been emitted, the moving notification sound being different from the starting movement notification sound.

2. The vehicle notification sound emitting apparatus as recited in claim 1, wherein
    the notification sound emission timing section is further configured to include a brake release operation as part of the additional start movement preparation operation of the vehicle such that the starting movement notification sound is emitted after the shift operation and the brake release operation have both been completed.

3. The vehicle notification sound emitting apparatus as recited in claim 1, wherein
    the notification sound control device is further configured to operate the sound emitting device to emit the moving notification sound after a brake release operation being completed while the vehicle was in a stopped state.

4. The vehicle notification sound emitting apparatus as recited in claim 3, wherein
    the notification sound emission timing section is further configured to emit the starting movement notification sound for a prescribed amount of time after both the shift operation and the brake release operation have both been completed.

5. The vehicle notification sound emitting apparatus as recited in claim 4, wherein
the notification sound emission timing section is further configured to set the prescribed amount of time to correspond to a period occurring from when both the shift operation and the brake release operation have both been completed until a movement start operation is performed.

6. The vehicle notification sound emitting apparatus as recited in claim 1, wherein
the notification sound control device is further configured to operate the sound emitting device to emit the moving notification sound in response to the vehicle moving before the brake release operation is completed.

7. The vehicle notification sound emitting apparatus as recited in claim 2, wherein
the notification sound control device is further configured to operate the sound emitting device to emit the moving notification sound after a brake release operation being completed while the vehicle was in a stopped state.

8. The vehicle notification sound emitting apparatus as recited in claim 7, wherein
the notification sound emission timing section is further configured to emit the starting movement notification sound for a prescribed amount of time after both the shift operation and the brake release operation have both been completed.

9. The vehicle notification sound emitting apparatus as recited in claim 8, wherein
the notification sound emission timing section is further configured to set the prescribed amount of time to correspond to a period occurring from when both the shift operation and the brake release operation have both been completed until a movement start operation is performed.

10. The vehicle notification sound emitting apparatus as recited in claim 9, wherein
the notification sound control device is further configured to operate the sound emitting device to emit the moving notification sound in response to the vehicle moving before the brake release operation is completed.

11. The vehicle notification sound emitting apparatus as recited in claim 2, wherein
the notification sound control device is further configured to operate the sound emitting device to emit the moving notification sound in response to the vehicle moving before the brake release operation is completed.

12. The vehicle notification sound emitting apparatus as recited in claim 3, wherein
the notification sound control device is further configured to operate the sound emitting device to emit the moving notification sound in response to the vehicle moving before the brake release operation is completed.

13. The vehicle notification sound emitting apparatus as recited in claim 4, wherein
the notification sound control device is further configured to operate the sound emitting device to emit the moving notification sound in response to the vehicle moving before the brake release operation is completed.

14. The vehicle notification sound emitting apparatus as recited in claim 5, wherein
the notification sound control device is further configured to operate the sound emitting device to emit the moving notification sound in response to the vehicle moving before the brake release operation is completed.

\* \* \* \* \*